Dec. 24, 1929.  F. M. REID  1,740,935
TRACTOR AND SEMITRAILER
Filed Feb. 3, 1928
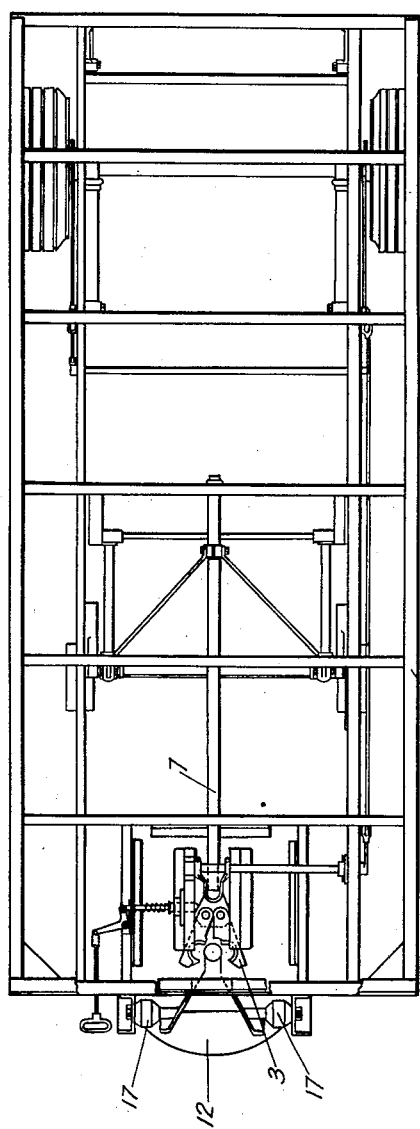
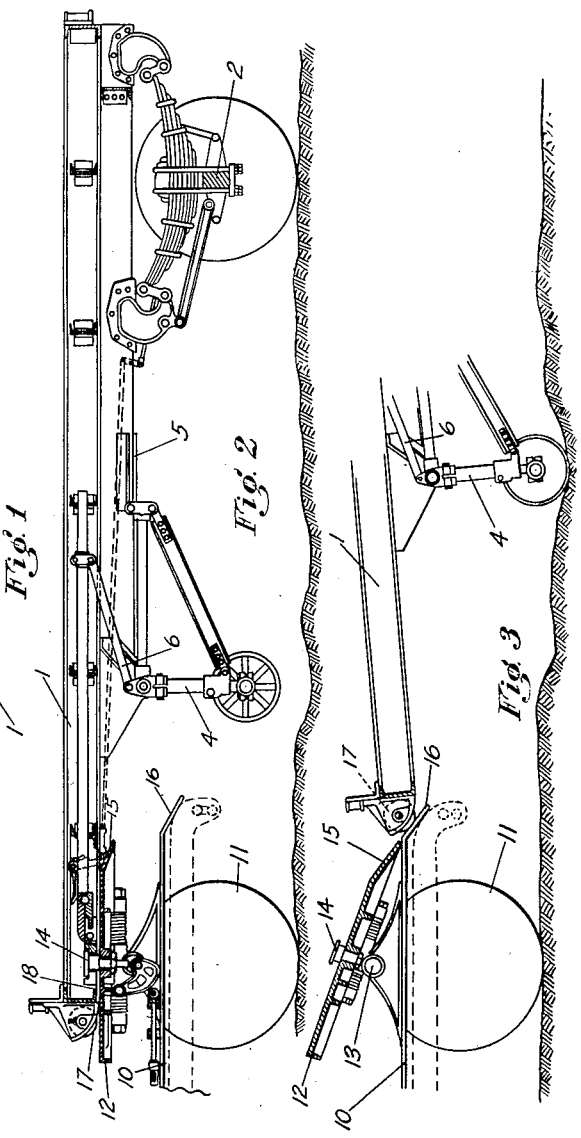
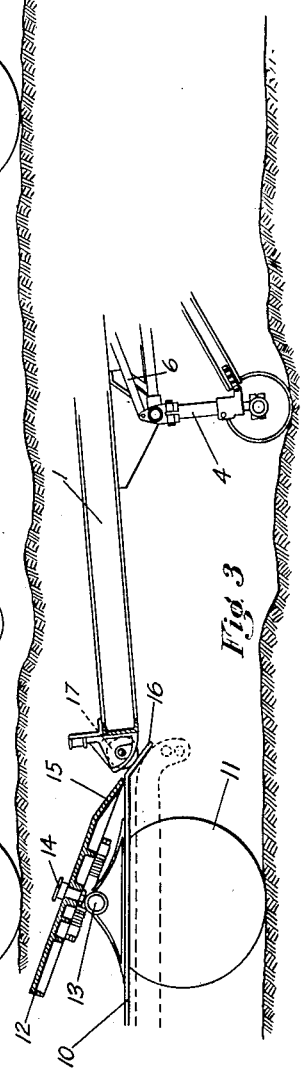
INVENTOR.
Frederick M. Reid.
BY
ATTORNEY.

Patented Dec. 24, 1929

1,740,935

UNITED STATES PATENT OFFICE

FREDERICK M. REID, OF DETROIT, MICHIGAN, ASSIGNOR TO FRUEHAUF TRAILER COMPANY, OF DETROIT, MICHIGAN, A CORPORATION OF MICHIGAN

TRACTOR AND SEMITRAILER

Application filed February 3, 1928. Serial No. 251,496.

This invention relates to a tractor and semitrailer, and more especially to a tractor and semi-trailer combination wherein the trailer is attachable or detachable from the tractor at will.

The invention is directed to a tractor-trailer combination wherein the connection between the two is established by the tractor backing into the trailer, in which operation, the trailer is lifted up from its supporting legs by the tractor and then coupled to the tractor. Among the objects of the invention is the provision of an improved arrangement for effecting the lifting action of the trailer. Sometimes the roadway is not level and it follows, that when a connection is to be made, the rear end of the tractor and the forward end of the trailer are not always in the same relative horizontal planes and the present invention contemplates an improved arrangement for taking care of situations of this character.

In the accompanying drawings:

Fig. 1 is a plan view of a trailer which may be employed for carrying out the invention.

Fig. 2 is a side view with some of the parts cut away and some of the parts in section, showing also the rear end of a tractor with the trailer lifted up and the parts in position so that further backing of the trailer pushes back the locking mechanism on the tractor and raises the supporting legs of the trailer.

Fig. 3 is a somewhat diagrammatic view illustrating a situation of relative positions between the tractor and trailer, where the present invention is particularly advantageous.

The semi-trailer consists of the usual frame construction 1 supported at its rear end by suitable running gear 2. The forward end of the trailer is provided with a suitable latching mechanism for co-operation with a member on the tractor, such latching mechanism being shown in Fig. 1 as consisting of a cam-like lock 3. When the trailer is detached from the tractor it is supported by a supporting structure 4. This structure may be movable so that it can be moved to and from operative position. For this purpose the supporting structure may be mounted in slides 5 and 6 and connected to the lock device 3 by rod 7. The lock device 3 reciprocates in its latching or unlatching operation thereby pulling the supporting legs to and from operative position. This trailer construction just described is an advantageous one, although other kinds of construction can be used. The details need not be further gone into inasmuch as they are generally well understood by those versed in the art and play no part in the present invention.

The rear end of any conventional type of tractor is shown at 10, supported by the running gear 11. The tractor carries a fifth wheel member 12 pivoted on a horizontal pivot 13 and carrying a king pin 14. When there is no load on this fifth wheel it assumes a normal position tilted rearwardly as indicated in Fig. 3. The fifth wheel thus provides an inclined surface. Such fifth wheels have been heretofore proposed and are used as follows: the tractor backs towards the trailer and the forward end of the trailer engages the slanting fifth wheel, whereupon the trailer is cammed up, when the tractor is backed sufficiently under the trailer, while lifting the same, the fifth wheel rights itself to the position shown in Fig. 2. Continued backing movement causes the cam lock 3 to engage around the king pin 14, and where the cam lock is slidable, as shown herein, it is pushed back thus raising the supporting legs 4 through the means of the rod 7.

Preferably, the rearmost part of the fifth wheel 12 is turned down angularly, as shown at 15. Sometimes the rear wheels of the tractor may be on a hillock or raised portion of the roadway, just as it starts to back under the trailer, or the converse of this may be true in that the supporting structure 4 may be in a depression, as illustrated in Fig. 3. When this occurs the forward end of the trailer may be too low to contact with the fifth wheel so that it will not be properly cammed up. To meet situations of this character the tractor is provided with an additional camming element which may take the form of a plate 16 secured to the rear end of the tractor. The angularity of this plate is preferably such as to be in substantial alignment with the portion 15 of the fifth wheel member 12 when this fifth wheel member is tipped rearwardly. This is depicted in Fig. 3. However, the additional camming member can be used with a fifth wheel which does not have a turned down rear portion.

It will be noted by reference to Fig. 3 that with the tractor and semi-trailer in the position shown the forward end of the semi-trailer is so low, as compared to the fifth wheel on the tractor, as to not engage the fifth wheel. It is at this time that the plate 16 cams up the trailer initially, and on continued backing movement of the tractor, the trailer is further cammed up by the tilted fifth wheel.

To facilitate the lifting of the trailer, it is preferable to provide the same with rollers 17 which engage the plate 16, and also the fifth wheel during a large part of the lifting action. These rollers, however, are not designed to support the trailer during the combined use of the tractor-trailer and accordingly are mounted so that their lowermost portion lies above the upper fifth wheel 18 on the trailer. Accordingly, when the lower and upper fifth wheel members are in operative position approximately as shown in Fig. 2, the rollers 17 are spaced from the fifth wheel member 12. Thus these rollers function only when the two units are separated or connected.

It has been found advantageous to describe the invention in connection with an abnormal condition, to wit: when the tractor or the trailer is supported by a hillock or a depression in the roadway respectively. It is within the invention, however, to so proportion the tractor and trailer as to make use of the additional fixed camming element under normal conditions, meaning, when the roadway is substantially level. By doing this a greater lift on the trailer may be had than by the use of the camming fifth wheel only. By effecting this greater lift of the trailer the supporting structure for the forward end of the trailer is raised further from the ground, and it is thus feasible to utilize a fixed or rigid supporting member as distinguished from the movable type which is moved to and from operating position by the action of connecting and disconnecting of the tractor and trailer.

Claims:

1. The combination with a tractor and semi-trailer, of a tiltable fifth wheel carried by the tractor, means on the trailer cooperating with this tiltable fifth wheel whereby the tiltable fifth wheel cams up the trailer when the tractor is backed up to the trailer, and a fixed camming element carried by the tractor to the rear of and below the tiltable fifth wheel which initially cams up the trailer when the trailer is in a horizontal plane abnormally low as compared to the horizontal plane of the tractor, said fifth wheel having a downwardly slanted rear portion, the fixed camming element being positioned at an angle to the horizontal substantially the same as the angle which the said downwardly turned portion assumes when the fifth wheel is in its extreme tilted position, and the said portion and camming member lying in close proximity to each other and substantially in the same plane to form a relatively long camming surface.

2. The combination with a tractor and semi-trailer, of a tiltable fifth wheel carried by the tractor, means carried by the trailer cooperating with this fifth wheel whereby the fifth wheel cams up the trailer as the tractor is backed toward the trailer, a fixed camming member carried by the tractor, this camming member being so positioned and being disposed at such an angle as to line up with the rear portion of the tiltable fifth wheel when the wheel is tilted rearwardly to form a substantially continuous camming surface, said fixed camming member initially camming up the semi-trailer when the forward end thereof is in a horizontal plane lower than the lowest portion of the tilted fifth wheel.

3. The combination with a tractor and semi-trailer, of a tiltable fifth wheel carried by the tractor, means carried by the trailer cooperating with this fifth wheel whereby the fifth wheel cams up the trailer as the tractor is backed toward the trailer, a fixed camming member carried by the tractor, said camming member being positioned and disposed at such an angle so as to cooperate with the rear portion of the tiltable fifth wheel when the same is tilted rearwardly to form a continuous camming surface with the fifth wheel, said fixed camming member initially camming up the semi-trailer when the forward end thereof is in a horizontal plane lower than the lowest portion of the tilted fifth wheel, said means on the trailer including rollers for riding up the cam surface.

In testimony whereof I affix my signature.

FREDERICK M. REID.